United States Patent
LaPine

(10) Patent No.: US 9,014,350 B2
(45) Date of Patent: Apr. 21, 2015

(54) METHOD FOR PROVIDING A BEACON TO ENSURE DELIVERY OF AUTOMATED MESSAGES OVER A TELEPHONE OR VOICE MESSAGING SYSTEM

(71) Applicant: Anthony LaPine, Los Gatos, CA (US)

(72) Inventor: Anthony LaPine, Los Gatos, CA (US)

(73) Assignee: Semotus Inc., Los Gatos, CA (US)

( * ) Notice: Subject to any disclaimer, the term of this patent is extended or adjusted under 35 U.S.C. 154(b) by 0 days.

(21) Appl. No.: 13/792,802

(22) Filed: Mar. 11, 2013

(65) Prior Publication Data

US 2013/0243170 A1 Sep. 19, 2013

Related U.S. Application Data

(60) Provisional application No. 61/609,982, filed on Mar. 13, 2012.

(51) Int. Cl.
| H04M 1/64 | (2006.01) |
| H04M 3/533 | (2006.01) |
| H04M 3/51 | (2006.01) |
| H04M 7/12 | (2006.01) |

(52) U.S. Cl.
CPC ........ *H04M 3/53333* (2013.01); *H04M 3/5158* (2013.01); *H04M 3/53366* (2013.01); *H04M 7/129* (2013.01); *H04M 2203/2011* (2013.01); *H04M 2203/2027* (2013.01)

(58) Field of Classification Search
CPC .......... H04M 3/53366; H04M 3/5158; H04M 3/53308; H04M 3/53333; H04M 3/533; H04M 1/6505; H04M 2203/2016; H04M 3/42221; H04M 3/487; H04M 1/656; H04M 1/65
USPC ............ 379/67.1, 88.22, 88.01, 88.12, 88.16, 379/88.25, 1.02, 68, 265.09, 88.13, 87, 85, 379/93.01; 455/413, 412.1
See application file for complete search history.

(56) References Cited

U.S. PATENT DOCUMENTS

| 4,069,397 | A | * | 1/1978 | Hashimoto ..................... 379/77 |
| 4,596,901 | A | * | 6/1986 | Hanscom et al. ................ 379/76 |
| 5,430,792 | A | * | 7/1995 | Jesurum et al. ............. 379/88.01 |
| 5,873,032 | A | * | 2/1999 | Cox et al. ...................... 455/417 |
| 5,909,647 | A | * | 6/1999 | Hashimoto et al. ......... 455/412.2 |
| 6,226,360 | B1 | * | 5/2001 | Goldberg et al. ............... 379/69 |
| 6,324,262 | B1 | * | 11/2001 | Tuttle .............................. 379/69 |
| 2010/0183128 | A1 | * | 7/2010 | Logan et al. ............... 379/88.22 |

* cited by examiner

*Primary Examiner* — Akelaw Teshale
(74) *Attorney, Agent, or Firm* — White-Welker & Welker, LLC; Matthew T. Welker, Esq.

(57) ABSTRACT

A method to detect the pause in the personal or system message to determine when to leave the payload message, but since there is an issue of the carrier disconnecting the call while waiting to make a determination if the personal or system message has been completed and the recording phase started, the present invention teaches a solution of sending a beep during every second of the pause time, to keep the line alive and the carrier therefore does not hang up and the message is left in full.

19 Claims, 2 Drawing Sheets

METHOD FOR PROVIDING A BEACON TO ENSURE DELIVERY OF AUTOMATED MESSAGES OVER A TELEPHONE OR VOICE MESSAGING SYSTEM

CROSS REFERENCE TO RELATED APPLICATIONS

This application claims priority from U.S. Patent Application Ser. No. 61/609,982, entitled "Method For Providing a Beacon to Ensure Delivery of Automated Messages Over a Telephone or Voice Messaging System", filed on 13 Mar. 2012. The benefit under 35 USC §119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to telephone and voice mail/messaging systems. More specifically, the present invention relates to leaving an automated message or payload by a sending system over a telephone or voice mail system so the recorded message or payload is not cut off or failed to be recorded.

BACKGROUND OF THE INVENTION

Telephone call centers are typically used to distribute phone calls to a large number of people nationally, regionally, and/or locally. The number of phone lines and amount of machine systems can be very large and expensive. The use of pre-recorded messages has become more popular in recent years. Using a pre-recorded message from a sending system, an auto dialing phone calls a list of phone numbers for potential recipients and plays the message. While this system removes the necessity of using a physical person, the sending party still must purchase the expensive multiple phone lines in order to call multiple recipients.

When a system sends out an automated message and it is answered over a phone or voice messaging system, the sending system then waits to detect a pause or silence for which is at least as much as a pre-programmed number of seconds, for example, three seconds of pause. On detecting this it begins to leave its payload message. The pause between the personal and system greeting could be more than the three seconds or any pre-programmed amount. Sometimes as the payload message is being spoken/delivered the recorded personal greeting of the telephone line or voice messaging system starts playing and the recording of the message/payload is either cut off or not recorded at all as a results of being delivered over or during the personal greeting of the telephone line or messaging system.

Conversely, the solution of merely extending, the pause from connection to delivery of the message/payload cannot simply be extended in duration. If the pause between the personal and system greeting is long then the telephone carrier, detecting no sound hangs up the call. Most carriers have a three second silence allowance, before the call is disconnected. In this case, the payload message is not recorded because the line got disconnected. This can happen even when a human answers the phone and there is a long silence, but it is most likely to happen with answering systems. Additionally, if the call is not disconnected, there will be a long pause before the message is delivered or recorded for playback, which often times results in the telephone line owner simply deleting the message before playback or immediately upon the start of payback after the long period of silence, in addition to the delivery of such message with an extended period of silence being viewed as unprofessional or other negative connotations being associated with the message.

Therefore, what is needed is a method to detect the pause in the message to leave the payload, usurping an issue of the carrier disconnecting the call while a sending system is waiting to deliver the message/payload to keep the line alive so the carrier does not hang up and the message is left in full.

SUMMARY OF THE INVENTION

When automated telephone messages are sent and these messages are answered by an answering machine on a telephone system, voice mail or any other voice messaging system, many users experience receiving incomplete or no message at all. Commonly, a message is sent by an automated service to a receiver, with an associated phone number. This could be a cell phone, a landline, a user name, box number, or any other means of identification in a voice mail system. The call is picked up by an answering machine or voice mail system. The greeting has two parts. The personal greeting and system greeting.

The receiver may respond with a voice output or recording such as "I am unable to answer the phone please leave a message and I will get back to you" also referred to as a personal message. Next there is a pause. Then a system message responds with a voice output or recording such as "Please leave a message or Press 0 to reach an operator or press * to hang-up or leave a message after the tone", also referred to as a system message.

The system that has placed this call starts to leave its message for the receiver also known as the payload message which can be something as simple as "Hi this message is to inform you that the Printers in building 7 are down arrange for to send the technician to fix it". It has been found that on several occasions the message left is truncated or if the original message was short, it appears as if no message has been left after the recording beep.

The present invention teaches a method to detect the pause in the personal or system message to determine when to leave the payload message, but since there is an issue of the carrier disconnecting the call while waiting to make a determination if the personal or system message has been completed and the recording phase started, the present invention teaches a solution of sending a beep during every second of the pause time, to keep the line alive and the carrier therefore does not hang up and the message is left in full.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
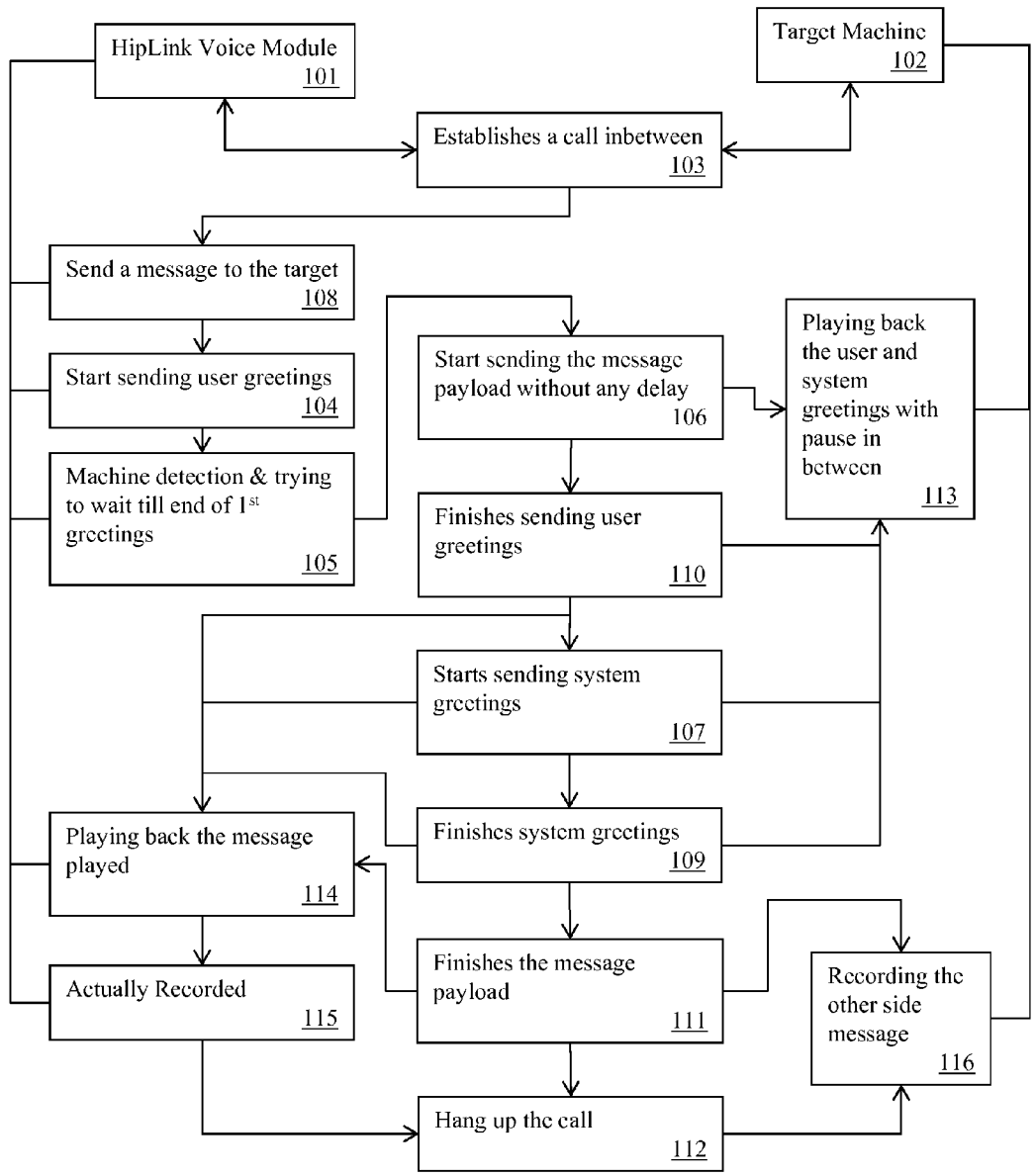
FIG. 1 is a flow chart illustrating the known process of automatically calling a receiver to deliver a recorded voice message or payload.

Now referring to the Figures, the embodiment of the method for providing a beacon to ensure delivery of automated messages over a telephone or voice messaging system is shown. As shown in FIG. 1, the flow chart describes the workflow without using the three beep beacon solution. In this embodiment, the computerized system comprising hardware and software for executing the method, referred to as the "voice module" 101, uses the hardware and software to initiate and establish a call 103 to the phone number of a target receiver machine 102. After a successful call is established 103 the target system machine 102 starts sending the User Greetings 104. The voice module 101 determines if the target receiver machine 102 is an answering machine. The detection 105 of whether the target system machine 102 is an answering machine is made by making calls to the API of the underlying systems, like CT_ADE, and Dialogic Voice cards, or Asterisk libraries (in the case of VoIP). The voice module 101 tries to wait for the end of the greeting 110. The voice module 101 sends the payload 108 right away without any delay 106. At this time the user greeting 104 would start playing and the user greeting 104 could still be playing when the payload message 108 is sent 114. When this happens, the payload message 108 does not get recorded fully and only a partial message is actually recorded 115. Hence the receiver does not receive the payload message 108 at all or receives only a part 116 of the payload message 108 since the payload message 108, initiated without delay 106 has not been recorded by the target machine 102 until the target machine 102 finishes the user greeting 104 and/or system greeting 107 and finishes sending the user greeting and finishes sending the user greeting 113. Depending on the length of the user greeting 104 and/or the system greeting 107, the payload message 108 is either recorded partially or not at all upon completion of the message payload delivery 111 and the voice module 101 ending the call 112.

Figure 2:
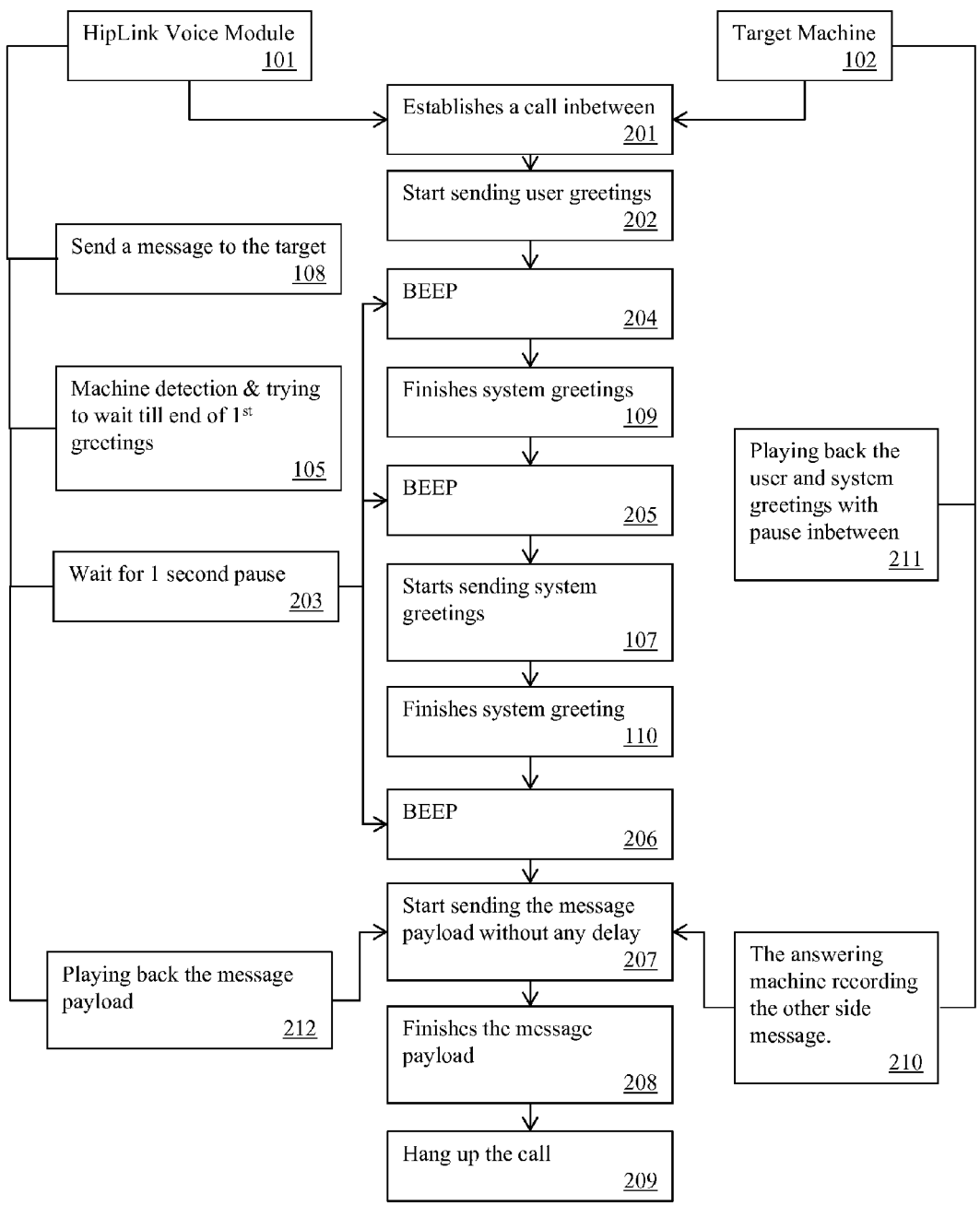
FIG. 2 is a flow chart illustrating the method of the present invention for delivery of the recorded message or payload to ensure the message or payload is recorded in full by the receiver using the three beep beacon solution.

Now referring to FIG. 2, the three beep solution of the present invention is taught. Here, the voice module 101 calls a phone number of a target receiver 102. After a successful call is established 201 the target receiver system 102 starts sending the User Greetings 202. The voice module 101 determines if this is answering machine. The detection 105 of whether it is an answering machine is made by making calls to the API of the underlying systems, like CT_ADE, and Dialogic Voice cards, or Asterisk libraries (in the case of VoIP). After a pause of 1 second 203 the voice module 101 sends a first beep 204. The voice module 101 next sends a second beep 205 and a third beep 206 for a total of three sent beeps with a one second pauses 203 in-between each beep. This happens even while the User Greetings 104 followed by the System greetings 107 are playing 211. After the three beeps are completed, the payload message 108 is started to be sent 207 and is delivered to the target system 102, this is recorded 210 by the target machine 102. After delivering the payload message 208 the voice module 101 ends the call 209. After the machine detection 105, which also consumes all/ most-of-the first greetings run time, the method then gives 3 more seconds to the other party to finish up its current and following greeting, and after that the method playbacks the message payload 212.

Through experimentation and trial and error, the inventor(s) have found that if they merely waited for three seconds, without the beeps, before sending the payload, the call gets disconnected by the carrier due to the silence and the payload is not recorded. Therefore, the inventor(s) came up with the solution of sending beeps to keep the line alive. With this the chance of successfully delivering the payload is substantially increased.

After the call is established, the voice module 101 immediately goes into the machine or human voice detection procedure 105 that does the detection of 1st greeting, and then followed by the three beep process. In the three beep process, the voice module 101 repeats "wait-for-1 second and beep" for three times. Then the voice module 101 plays the beep anyway whether we get silence or not. The voice module 101 does it three times. The voice module 101 will wait at most up to a total of three seconds with beeps in between. And after these three seconds, the voice module 101 starts the greetings and payload message anyway.

This enables the voice module 101 to at least give a total of three seconds to the other side to complete its greetings, and in the mean-time, while waiting, the voice module 101 also sends its beeps so that if the other party or carrier is also detecting silence, it can be assured that the voice module 101 is still there. Also if the other side is the human, it will let him know that an automated message delivery system is yet to deliver its payload message.

It the other side happens to start its second greeting after three seconds, say at a fourth second, then the voice module 101 will start our side of the message playback as per the pre-defined procedure, and in that way the voice module 101 will again get the issue of incomplete message recording. However its probability is quite rare given the current state of phone messaging systems.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for providing a beacon to ensure delivery of automated messages over a telephone or voice messaging system recorded on non-transitory computer-readable medium and capable of execution by a computer, said method comprising the steps of:
providing a voice module running software capable of execution by a computer;
calling a phone number of a target receiver by the voice module;
establishing a successful call with the target receiver system by the voice module;
receiving a first greeting from the target receiver;
determining if the target receiver is an answering machine;
sending a first beep after a pause of one second by the voice module to keep the call alive;
sending the payload message to the target system by the voice module;
terminating the call by the voice module.

2. The method of claim 1, further comprising the step of sending a second beep after a pause of one second by the voice module.

3. The method of claim 2, further comprising the step of sending a third beep after a pause of one second by the voice module.

4. The method of claim 1, further comprising the step of detecting whether it is an answering machine is made by making calls to the API of the underlying systems, like CT_ADE, and Dialogic Voice cards, or Asterisk libraries in the case of VoIP.

5. The method of claim 1, wherein the target message is recorded by the target machine.

6. The method of claim 3, further comprising the step of after the machine detection, which also consumes all/most-of-the first greetings run time, the method then gives three more seconds to the other party to finish up its current and following greeting, and after that the method playbacks the message payload.

7. The method of claim 3, further comprising the step of after the call is established, the voice module immediately goes into the machine or human voice detection procedure that does the detection of a first greeting, and then followed by the three beep process.

8. The method of claim 3, further comprising the steps of in the three beep process, the voice module repeats "wait-for-1 second and beep" for three times;
then the voice module plays the beep anyway whether there is silence or not;
the voice module does it three times;
the voice module will wait at most up to a total of three seconds with beeps in between; and
after these three seconds, the voice module starts the greetings and payload message anyway.

9. The method of claim 3, further comprising the step of sending a plurality of beeps with a one second pause between each beep by the voice module.

10. A system for providing a beacon to ensure delivery of automated messages over a telephone or voice messaging system recorded on non-transitory computer-readable medium and capable of execution by a computer, said system comprising the steps of:
initiating a call to a receiver by the voice module;
listening to a personal message or a system message;
determining when to leave a payload message to the receiver by the voice module to keep the call alive;
detecting a pause in the personal message or system;
sending a beep during every second of the pause time by the voice module; and
delivering the payload message for recording by the receiver by the voice module.

11. The system of claim 10, further comprising the step of providing a beacon by the voice module to ensure delivery of automated messages over a telephone or voice messaging system.

12. The system of claim 10, wherein the call is automatically initiated to a receiver by the voice module.

13. The system of claim 10, wherein the receiver is a cell phone, a landline, a user name, box number, or any other means of identification in a voice mail system.

14. The system of claim 10, wherein
the call is picked up by an answering machine or voice mail system; and
the greeting has one part.

15. The system of claim 14, further comprising the steps of sending a beep during every second of the greeting, to keep the line alive by the voice module;
detecting a pause in the personal message or system message by the voice module;
sending a beep during every second of the pause time after the first greeting by the voice module;
determining when to leave a payload message to the receiver after the greeting part and subsequent pause by the voice module; and
delivering the payload message for recording by the receiver by the voice module.

16. The system of claim 15, further comprising the steps of waiting for a period of time to elapse or a number of beeps to have occurred to determine the end of the greeting by the voice module; and
delivering the payload message by the voice module.

17. The system of claim 10, wherein
the call is picked up by an answering machine or voice mail system; and
the greeting has two parts.

18. The system of claim 17, further comprising the steps of sending a beep during every second of the first greeting part, to keep the line alive by the voice module;
sending a beep during every second of the second greeting part, to keep the line alive by the voice module;
determining when to leave a payload message to the receiver after the second greeting part by the voice module; and
delivering the payload message for recording by the receiver by the voice module.

19. A method for providing a beacon to ensure delivery of automated messages over a telephone or voice messaging system recorded on non-transitory computer-readable medium and capable of execution by a computer, said method comprising the steps of:
providing a voice module running software capable of execution by a computer;
calling a phone number of a target receiver by the voice module;
establishing a successful call with the target receiver system by the voice module;
receiving a first greeting from the target receiver;
determining if the target receiver is an answering machine by the voice module;
sending a first beep after a pause of one second by the voice module to keep the call alive;

sending a second beep after a pause of one second by the voice module;
sending a third beep after a pause of one second by the voice module;
sending the payload message to the target system by the voice module; and
terminating the call by the voice module.

\* \* \* \* \*